United States Patent
Tai et al.

(10) Patent No.: US 8,040,678 B2
(45) Date of Patent: Oct. 18, 2011

(54) CONNECTING BOX FOR A SOLAR PANEL

(75) Inventors: Hung-Chi Tai, Jhonghe (TW);
Yung-Chih Hung, Jhonghe (TW)

(73) Assignee: Alltop Electronics (Su Zhou) Co., Ltd, Taicang, Jiangsu Province (CN)

( * ) Notice: Subject to any disclaimer, the term of this patent is extended or adjusted under 35 U.S.C. 154(b) by 578 days.

(21) Appl. No.: 12/257,916

(22) Filed: Oct. 24, 2008

(65) Prior Publication Data

US 2010/0039781 A1 Feb. 18, 2010

(30) Foreign Application Priority Data

Aug. 12, 2008 (CN) .......................... 2008 1 0131034

(51) Int. Cl.
*H05K 5/00* (2006.01)

(52) U.S. Cl. ......... 361/752; 439/816; 174/480; 136/251

(58) Field of Classification Search .................. 439/876, 439/441, 79, 816, 76.2; 361/837, 811, 728, 361/820; 174/520, 50, 88 R, 565, 112, 480, 174/72 A, 68.2, 496, 372; 29/748, 854, 68.2, 29/484; 136/246, 244, 252, 251, 600, 245
See application file for complete search history.

(56) References Cited

U.S. PATENT DOCUMENTS

| 7,467,966 B2 * | 12/2008 | Pizzi .............................. 439/441 |
| 2003/0032313 A1 * | 2/2003 | Kojima et al. .................. 439/79 |
| 2007/0141893 A1 * | 6/2007 | Pizzi .............................. 439/441 |
| 2008/0124988 A1 * | 5/2008 | Blanchot ....................... 439/876 |

* cited by examiner

*Primary Examiner* — Hung Duong
(74) *Attorney, Agent, or Firm* — Sughrue Mion, PLLC (57) ABSTRACT

A connecting box for connecting to a solar panel includes a housing and a terminal assembly. The housing has an opening for introducing an electrical connecting element of the solar panel. The terminal assembly is disposed in the housing, which includes a first terminal having a first contact portion for contacting and applying an elastic force to the electrical connecting element and a first releasing portion extending from the first contact portion. The first releasing portion is non-obstructedly arranged in the housing to be operable to release the elastic force without assistance of any tools when the solar panel is inserted into or extracted from the connecting box.

20 Claims, 6 Drawing Sheets

CONNECTING BOX FOR A SOLAR PANEL

BACKGROUND OF THE INVENTION

1. Field of the Invention

The present invention relates to a connecting box, and more particularly to a connecting box for connection to a solar panel.

2. Description of Related Art

Solar panels have a large number of solar cells that are used to convert power from sunlight. The power generated by the solar cells is conveyed via electric lines for feeding into an alternative current (AC) network or to a battery. A connecting box is generally provided for electrical connection between the solar panel and the AC network or the battery.

Figure 5:
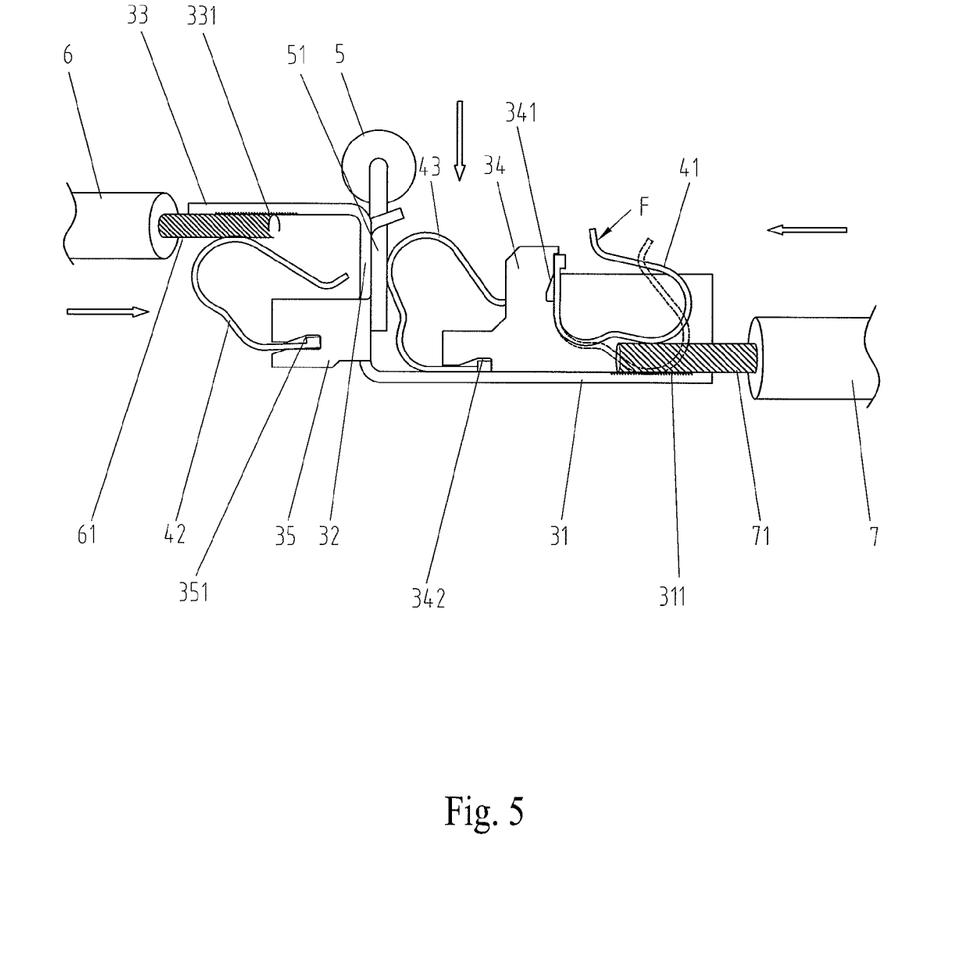
FIG. 5 is a cross-section view of the terminal assembly with a solar panel, a cable, and a diode inserted.

U.S. Pat. No. 7,134,883 B2 discloses a connecting box having a housing and a number of terminal assemblies arranged side by side in the housing. The housing is provided with an opening for introducing the electrical lines of the solar panel to one ends of the terminal assemblies, and a cable connected to the other ends of the terminal assemblies for output the converted power to the AC network or the battery. A number of diodes each connects two neighbouring terminal assemblies to establish an electrical connection therebetween. As shown in FIG. 5 of the drawings of the patent, an elastic contact 10 for connection to the electrical lines of the solar panel is encircled within the contact base 13. A suitable tool is required to extend through an opening defined on the top of the contact base to operate the elastic contact to allow a user to insert or extract the electrical lines of the solar panel. However, the suitable tool is not always available to the user when the solar panel is damaged and need to be replaced, in such situation, it is quite difficult for the user to implement the replacement. In addition, the terminal assembly has a relatively complex structure thereby making manufacture both time and cost inefficient.

SUMMARY OF THE INVENTION

Accordingly, it is an object of the present invention to provide a connecting box that is convenient to allow insertion or extraction of the electrical lines of the solar panel.

It is another object of the present invention to provide a connecting box having a relatively simple contact assembly.

In order to achieve afore-mentioned objects, there is provided, according to one aspect of the invention, a connecting box for connecting to a solar panel includes a housing and a terminal assembly. The housing has an opening for introducing an electrical connecting element of the solar panel. The terminal assembly is disposed in the housing, which includes a first terminal having a first contact portion for contacting and applying an elastic force to the electrical connecting element and a first releasing portion extending from the first contact portion. The first releasing portion is non-obstructedly arranged in the housing to be operable to release the elastic force without assistance of any tools when the solar panel is inserted into or extracted from the connecting box.

According to another aspect of the invention, there is provided a connecting box for connecting between a solar panel and a cable to convey power converted by the solar panel from sunlight. The connecting box includes a housing and a terminal assembly. The housing has an opening for introducing an electrical connecting element of the solar panel. The terminal assembly includes a terminal base disposed in the housing, a first terminal disposed in the terminal base for connecting the electrical connecting element of the solar panel, and a second terminal disposed in the terminal base for connecting the cable. The first and second terminals are substantially identical in structure to enhance the common usage of the contacts thereby making manufacture both time and cost efficient.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION OF THE INVENTION

FIGS. 1 to 5 show a connecting box 100 for a solar panel in accordance with one preferred embodiment of the present invention. The connecting box includes an insulating housing 1, a lid 2 covered on the housing 1, four terminal assemblies assembled in the housing 1, and a pair of cables 6 connecting to two opposite ones of the terminal assemblies.

Figure 1:
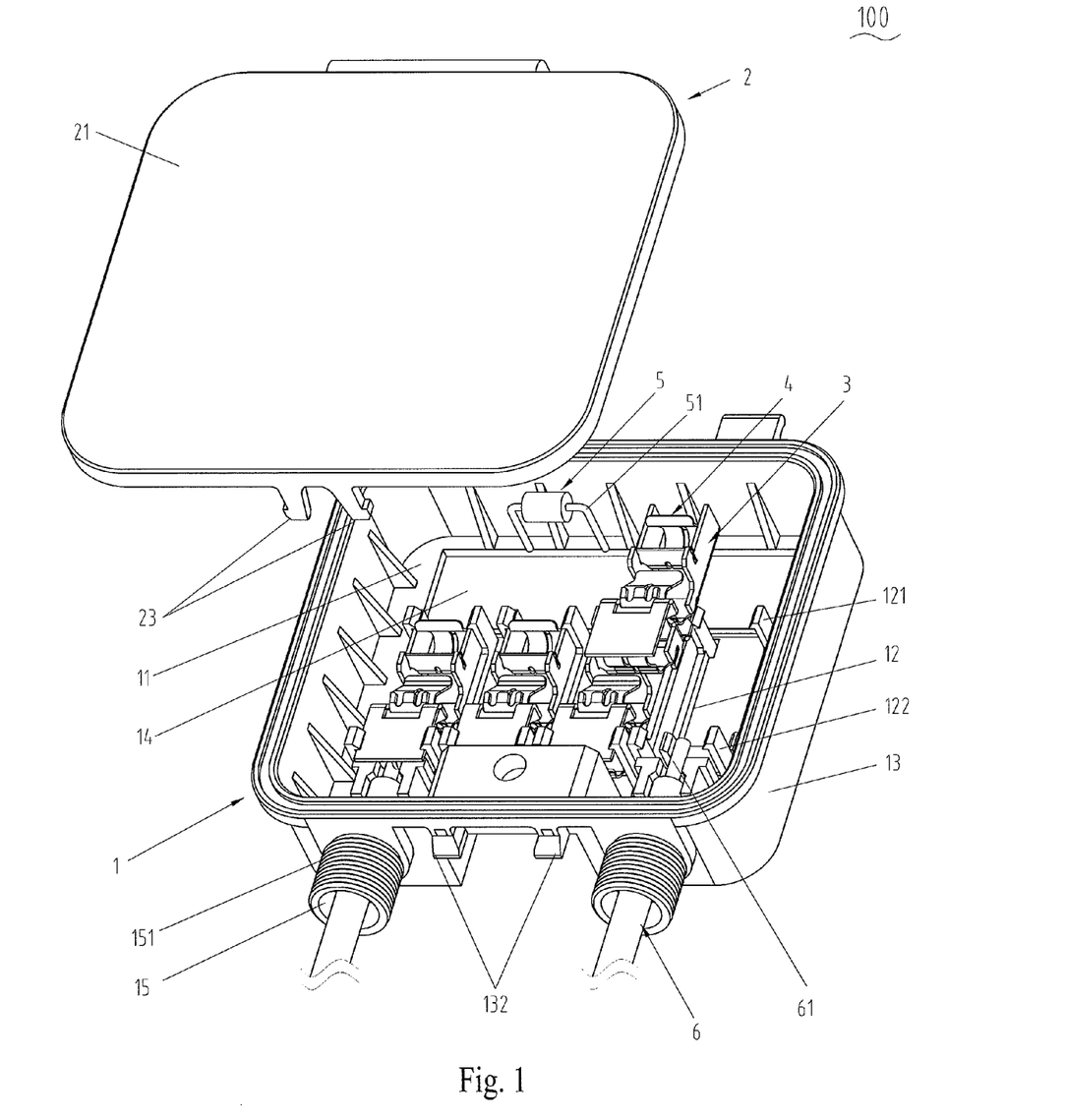
FIG. 1 is a perspective view of a connecting box in accordance with present invention.
Figure 2:
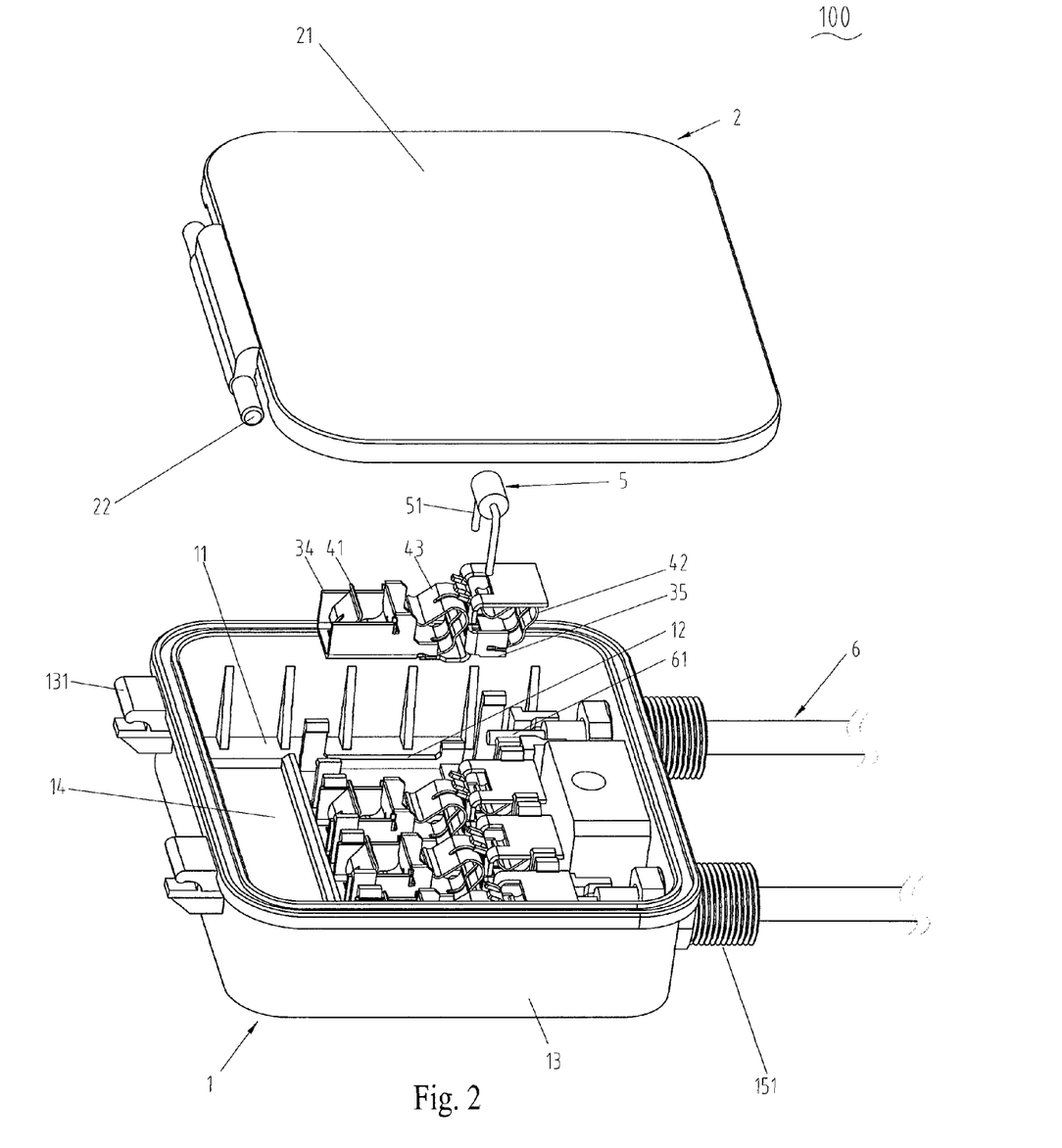
FIG. 2 is an exploded view of the connecting box in FIG. 1.
Figure 3:
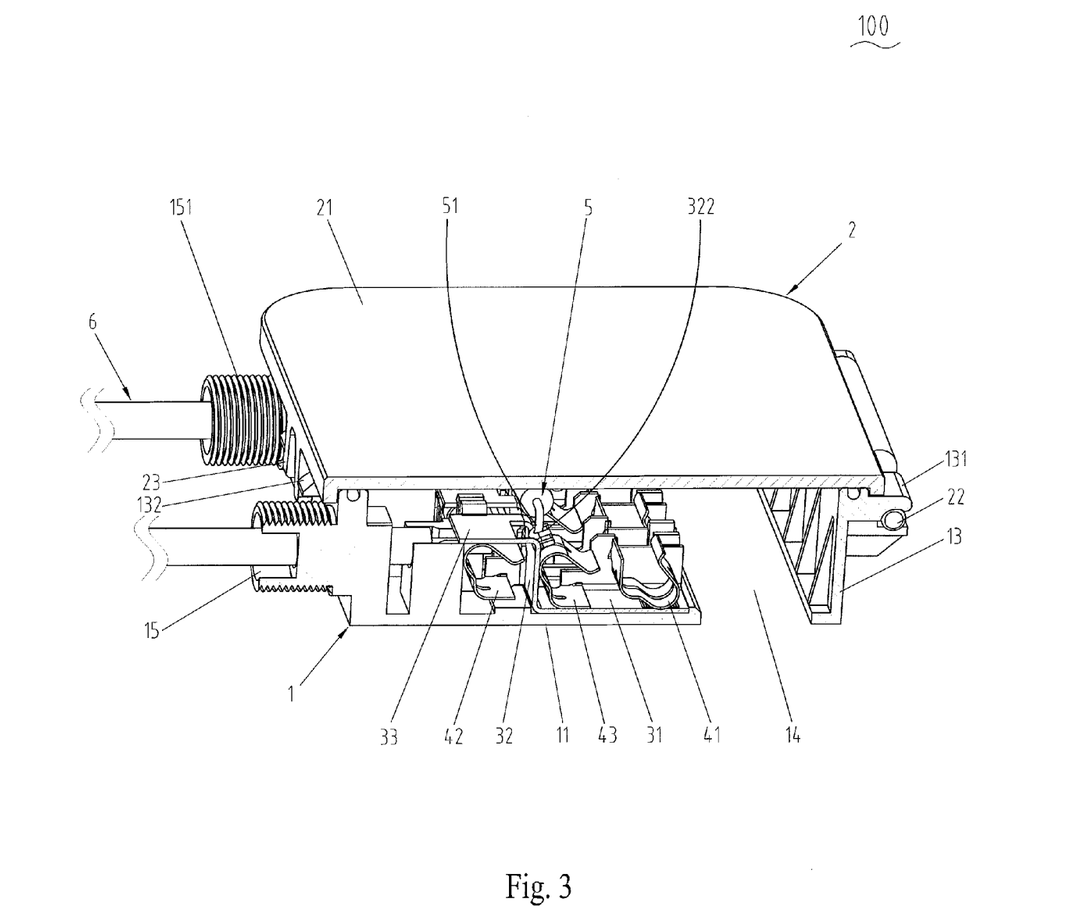
FIG. 3 is a perspective view of the connecting box which is partially cutting away to show interior construction thereof.

The housing 1 has a base board 11 and peripheral side walls 13. A number of ribs (not labeled) are disposed between the base board 11 and the side walls 13 to reinforce the connection therebetween. The base board 11 is provided with an opening 14 adjacent to one longitudinal side wall thereof for introducing electrical connecting elements of a solar panel, which will be described in detail hereinafter with reference to FIGS. 5 and 6. Four retaining frames 12 are arranged on the base board 11 parallel to one another along a lateral direction. Each retaining frame 12 includes two pairs of locking arms 121, 122 symmetrically disposed at both lateral sides of the frame 12. Each locking arm 121, 122 extends upright from the base board 11 and is formed with a hook portion at the top thereof for retaining the terminal assembly. Two cable openings 15 are arranged on the other longitudinal side wall 14 of the housing 1 for being extended through by a pair of cables 6. Person skilled in the art will recognize that the cables are used to output the power converted from sunlight to an AC network or a battery, and the two cables respectively form a positive and a negative poles of a power supply. As shown in FIG. 1, after inserted in the housing 1, each cable 6 is connected to a corresponding terminal assembly via a contacting means, and then a nut (not shown) is screwed onto threaded grooves 151 formed outside of the opening 15 to fasten the cable 6 therein. In respect of the connection of the cable to the terminal assembly, it will be fully described hereinafter.

Referring to FIG. 1, a pair of spaced protrusions 132 is formed on one of the longitudinal side walls 14, and at the opposite side wall 14, a pair of blocks 131 is provided and each defines a passageway (not labeled) therethrough. Also referring to FIG. 2, the lid 2 may include a cover plate 21, a pair of latches 23 and a pivot 22 respectively disposed at opposite longitudinal edges of the cover plate 21. The lid 2 may be rotatable around the pivot 22 to open or close relative to the housing 1, and in close state, the latches 23 of the lid 2 engage with the protrusions 132 to secure the lid 2 onto the housing 1.

Figure 4:
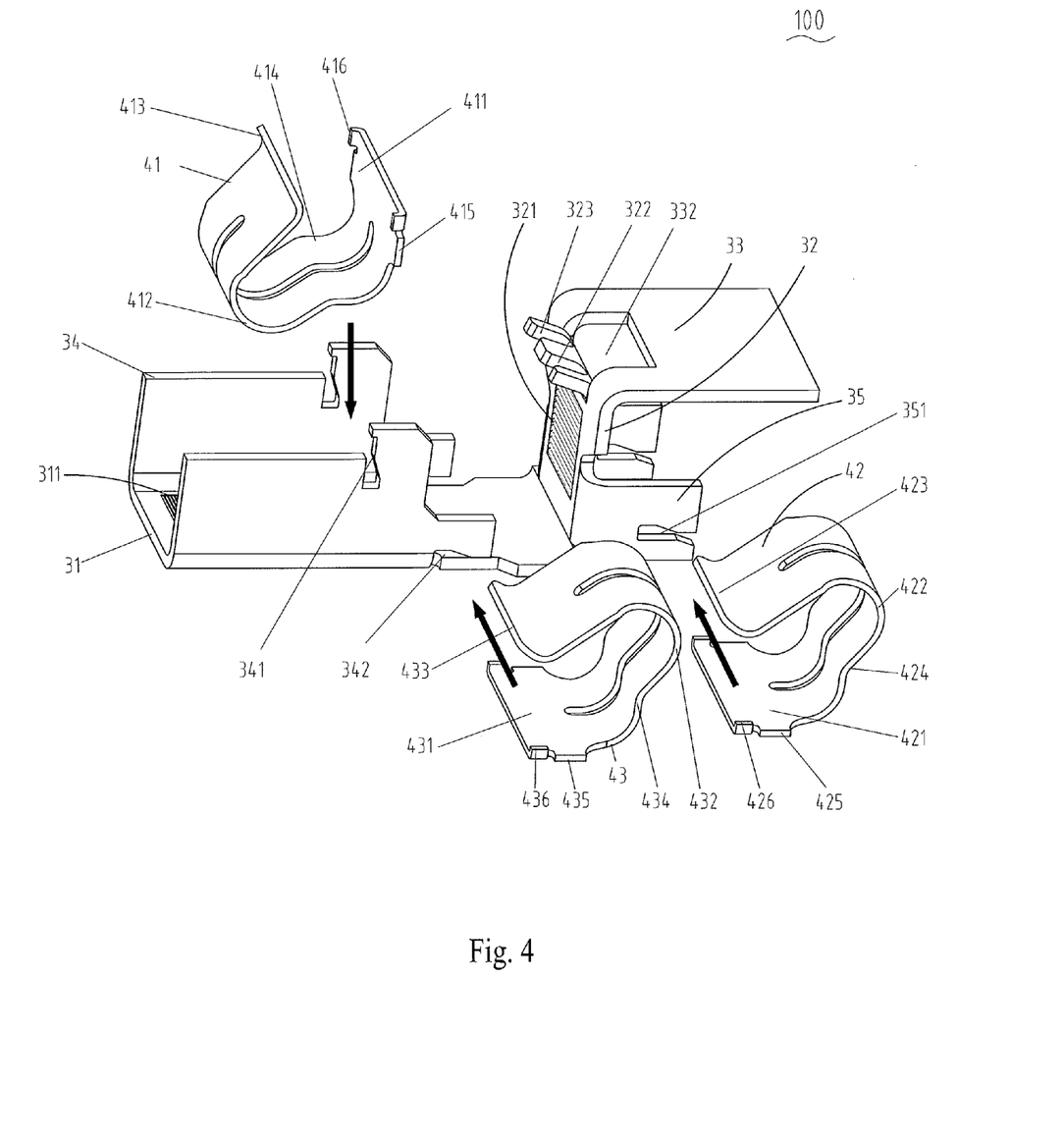
FIG. 4 is an exploded view of a terminal assembly of the connecting box.

In present embodiment, the four terminal assemblies are essentially identical in construction, for reasons of simplification, below only one terminal assembly is described. With reference to FIG. 4, the terminal assembly includes a terminal base 3, and a first, second, third elastic terminals 41, 42, 43 retained in the terminal base 4. It will be noted that the terminal base or the elastic terminals may be stamped from a metallic plate. The terminal base 3 is composed of a generally rectangular bottom plate 31, a vertical plate 32 extending upwardly from a longitudinal rear end of the bottom plate 31, and a top plate 33 extending rearward from a top end of the vertical plate 32. On both lateral sides of the bottom plate 31, a pair of first side plates 34 extends upright and each defines a first receiving slot 341 arranged vertically at a top thereof. The first side plate 34 and the bottom plate 31 together defines a second receiving slot 342 arranged longitudinally therebetween. A pair of second side plates 35 extends rearward from both lateral sides of the vertical plate 32. Each second side plate 35 defines a third receiving slot 351 extending longitudinally therein. The first, second, third receiving slots 341, 342, 351 are used to receive the first, second, third spring terminals 41, 42, 43 respectively. The first, second, third receiving slots 341, 342, 351 are substantially identical in construction. Each of them is formed narrowly at opening thereof and gradually widening toward the bottom thereof.

A pair of guiding grooves 322, 323 extends upwardly and obliquely from the top of the vertical plate 32, and a hole 332 is defined in the top plate 33. Referring now to FIG. 4 in conjunction with FIG. 5, the terminal base 3 defines a first, second, and third contact regions 311, 331, 321 on the bottom plate 31, the vertical plate 32, and the top plate 33 opposing the first, second, and third terminals 41, 42, 43 respectively. To enhance the contact stability between the terminal base 3 and the terminal 41, 42, 43, each contact region is formed with a friction enhancing structure. In present embodiment, the friction enhancing structure consists of a number of indentations formed on the surface of the terminal base 3. It would be apparent to those skilled in the art that the friction enhancing structure may also take the form of a variety of well-known structures such as embossments, strips, or coated abrasive formed the surface of the terminal base 3.

Figure 6:
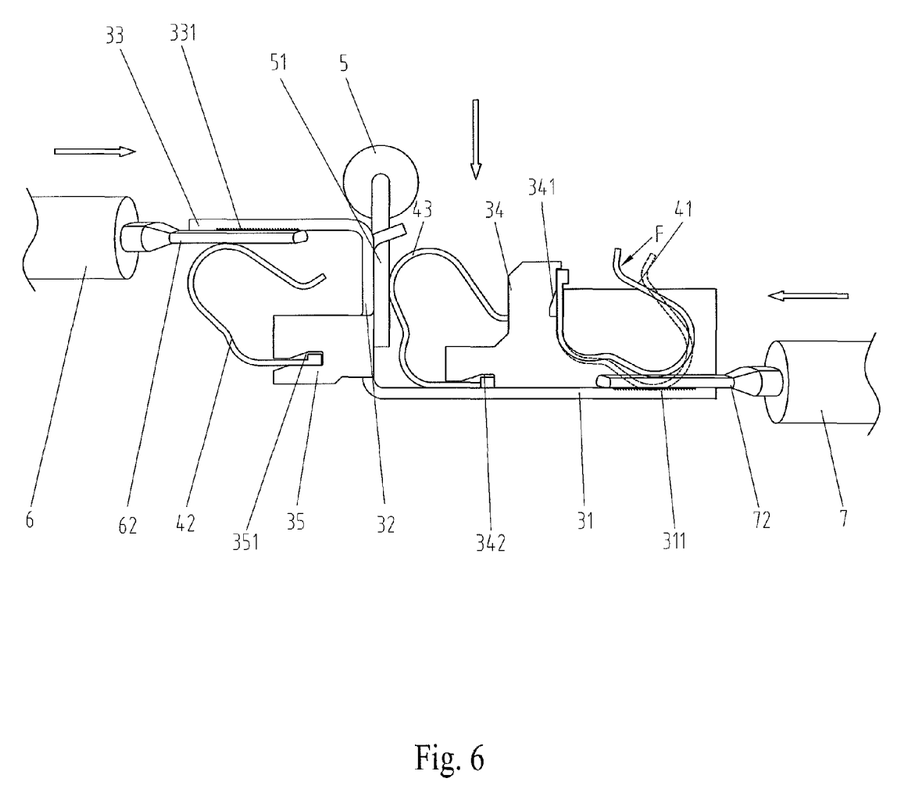
FIG. 6 is a cross-section view similar to FIG. 5, which shows an alternative embodiment of the terminal assembly with connection to the solar panel, the cable, and the diode.

Referring to FIG. 4, in present embodiment, the first, second, and third terminals 41, 42, 43 are substantially identical in structure, herein only the first terminal 41 is exemplified. The first terminal 41 which includes a first retaining portion 411, a first contact portion 412 extending from and bending forwardly relative to the first retaining portion 411, and a first releasing portion 413 extending from and bending forwardly relative to the first contact portion 412. It should be noted that an external force F (as indicated in FIGS. 5 and 6) will be frequently exerted to the first releasing portion 413, if the force exertion is so frequent or so large that exceeds the elastic instability of the elastic terminal, a permanent deformation will be generated and not resume to its original position. To avoid the permanent deformation, the first terminal 41 further includes a reverse bend portion located between the first retaining portion 411 and the first contact portion 412 to improve the elastic stability of the terminal. Furthermore, the first releasing portion 411 of the first terminal 41 also includes a reverse bend section (not labeled) for being conveniently operated when the user applying the force F. It should be noted that the terms "forwardly" and "reversely" are used herein to refer to a movement in opposite directions, just like in present embodiment, the term "forwardly" indicates bending anticlockwise, whilst the term "reversely" indicates bending clockwise. It would be apparent that the indication of the two terms can also be interchanged, in other words, "forwardly" indicates bending clockwise while "reversely" indicates bending anticlockwise. The first retaining portion 413 has a pair of ear sections 415 and a pair of wing sections 416 projected at both lateral sides thereof for engaging to the first receiving slot 341 of the terminal base 3.

Referring to FIG. 4, as the arrows indicated, the first terminal 41 is inserted into the terminal base 3 vertically, and the second, third terminals 42, 43 are inserted into the terminal base 3 horizontally, and in the mean time, the first, second, and third retaining portions 411, 421, 431 snugly fitted into the first, second, and third receiving slots 341, 342, 351 to retain the terminals in the terminal base 3, in which the wing sections 415, 425, 435 of the terminals 411, 421, 431 are positioned at the narrower regions of the receiving slots 341, 342, 351 respectively, and the ear portions 426, 436 of the second, third retaining portions 421, 431 are positioned at the wider regions of the second, third receiving slots 342, 351, and the ear portion 416 of the first retaining portion 411 abuts against a pair of protrusions (not labeled) extending from the top of first side wall 34. Also referring to FIG. 5, the first, second, and third contact portions 412, 422, 432 of the terminals elastically press on the first, second, and third contact regions 311, 331, 321 of the terminal base 3. The first releasing portion 413 extends beyond the top of the first side wall 34. The second releasing portion 423 and the second reverse bend portion 424 are located below the top wall 33. The third releasing portion 433 and the third reverse bend portion 434 are located below the top of the first side wall 34. Referring back to FIGS. 1 to 3, each terminal assembly is assembled in the corresponding retaining frame, and the locking arms 121, 122 hook the first side wall 34 and the top wall 33 of the terminal base 3. An electrical component is connected between the two neighbouring terminal assemblies 3 to establish an electrical path therebetween.

Referring now to FIG. 5, in present embodiment, the electrical component is a diode with two connection leads extending downwardly, and the cable 6 has an electrical conductor 61, and the electrical connecting element of the solar panel is an electrical line 7 with an electrical conductor 71. Along the insertion directions as the arrows indicated, the two leads 51 of the diode 5 are inserted through two guiding grooves 322, 323 respectively defined in two neighbouring terminal bases 3 and pressed against the third contact region 321 by the third contact portion 432 of the third terminal 43. The cable 6 extends through the cable opening 5 with the electrical conductor 61 pressed against the second contact region 331 by the second contact portion 422 of the second terminal 42. The electrical line 7 passes through the opening 14 with the conductor 71 pressed against the first contact region 311 by the first contact portion 412 of the first terminal 41. It should be noted that the first releasing portion 413 of the first terminal 41 is disposed non-obstructedly in the housing 1, by this arrangement, it is convenient for a user to operate the first terminal 413 by user fingers directly pressing on the first releasing portion 413 to release the elastic force applied on the first contact region 311 by the first contact portion 412, thereby actuating the first terminal 41 to move from the position in broken line to the position in real line to allow the insertion of the conductor 71. It will be apparent that such arrangement also makes the manual withdrawn of the conductor 71 convenient for the reason of user fingers direct operation. With respect to the second or third terminals 42, 43, in present embodiment, a suitable tool is still required to actuating the second or third releasing portion 423, 433 to allow the insertion or extraction of the conductor 61 of the cable 6 or the lead 51 of the diode 5.

FIG. 6 illustrates an alternative embodiment of the terminal assembly similar to that of FIG. 5 with the cable and the electrical wire of the solar panel as only elements that are different in present embodiment. Accordingly, the other elements are labeled with identical reference numerals. In present embodiment, the cable 6 and the electrical wire 7 of the solar panel each employs a board 62, 72 with golden fingers instead of conductor as described in above embodiment. It will be apparent to those skilled in the art that various other alternatives to the cable or electrical wire may be employed, such as employing the contacts to replace the boards with golden fingers of present embodiment or the conductors of the previous embodiment.

As one advantage of the connecting box described previously, the elastic terminal for electrical elements of the solar panel has the releasing portion non-obstructedly arranged in the housing. This arrangement facilitates the operation of the insertion or extraction of the electrical elements of the solar panel because no tool is required and the operator can perform it only by using finger. Moreover, the contacts for connecting the solar panel, the cable, and the diodes are substantially identical in structure, which enhances the common usage of the contacts thereby making manufacture both time and cost efficient. Furthermore, the terminal base is formed with friction enhancing structures at regions where the conductors of the solar panel and the cable, and leads of the diodes positioned to enhance contact stability therebetween.

While the description as set forth is only a preferred embodiment of the present invention, it can also achieved by other various embodiments, for example, the first, second, third terminals may integrally formed with the terminal base just ensure the releasing portion of the first terminal extending beyond the terminal base. In addition, since the diodes are seldom disassembled from the terminal base after assembling, the leads of the diodes may connect to the terminal base via a permanent connection means, such as soldering means, in this case, the third terminal can be omitted and the manufacture expense is reduced. Any equivalent modifications made by a person skilled in the art according to the teaching of the present invention should be construed to be included within the scope or spirit of the appended claims as defined in the present invention.

What is claimed is:

1. A connecting box for connecting to a solar panel comprising:
   a housing having an opening for introducing an electrical connecting element of the solar panel;
   a terminal assembly disposed in the housing, the terminal assembly comprising a first terminal having a first contact portion for contacting and applying an elastic force to the electrical connecting element and a first releasing portion extending from the first contact portion, the first releasing portion being non-obstructedly arranged in the housing to be operable to release the elastic force without assistance of any tools.

2. The connecting box according to claim 1, wherein the terminal assembly comprises a terminal base disposed in the housing, and the first terminal is disposed in the terminal base with the first releasing portion exposed outside of the terminal base.

3. The connecting box according to claim 2, wherein the terminal base has a bottom wall and a pair of side walls extending from opposite sides of the bottom wall, wherein the first contact portion is located in area defined by the bottom wall and the side walls, and the first releasing portion protrudes out of the area.

4. The connecting box according to claim 2, wherein the terminal base defines a receiving slot, and the first terminal has a retaining portion for being snugly fitted in the receiving slot to secure the first terminal to the terminal base.

5. The connecting box according to claim 2, wherein the first terminal and the terminal base are integrally formed.

6. The connecting box according to claim 2, further comprising a cable, wherein the terminal assembly comprises a second terminal disposed in the terminal base having a second contact portion for electrically connecting the cable.

7. The connecting box according to claim 6, further comprising a diode, wherein the terminal assembly comprises a third terminal disposed in the terminal base having a third contact portion for electrically connecting the diode.

8. The connecting box according to claim 7, wherein the terminal base defines a guiding groove to guide insertion of the diode.

9. The connecting box according to claim 7, wherein the first terminal and the second or the third terminal are substantially identical in structure.

10. The connecting box according to claim 6, wherein the cable comprises a electrical conductor for contacting the second contact portion of the second terminal.

11. The connecting box according to claim 2, wherein the terminal base is formed with a friction enhancing structure at a region opposite to the first contact portion of the first terminal.

12. The connecting box according to claim 10, wherein friction enhancing structure comprises a plurality of indentations formed on the bottom wall of the terminal base.

13. The connecting box according to claim 2, wherein the housing is provided with a plurality of locking arms for locking the terminal base in the housing securely.

14. The connecting box according to claim 1, the first terminal comprises a first retaining portion, and the first contact portion extends from and bends forwardly with respect to the first retaining portion, whilst the first releasing portion extends from and bends forwardly with respect to the first contact portion.

15. The connecting box according to claim 14, wherein the first terminal further comprises a reverse bend portion located between the first retaining portion and the first contact portion.

16. The connecting box according to claim 14, wherein the first releasing portion further comprises a reverse bend section for being conveniently operable by a user.

17. A connecting box for connecting between a solar panel and a cable to convey power converted by the solar panel from sunlight, comprising:
   a housing having an opening for introducing an electrical connecting element of the solar panel;
   a terminal assembly comprising
      a terminal base disposed in the housing,
      a first terminal disposed in the terminal base for connecting the electrical connecting element of the solar panel,
      a second terminal disposed in the terminal base for connecting the cable; wherein
      the first and second terminals are substantially identical in structure.

18. The connecting box according to claim 17, further comprising a diode, wherein the terminal assembly comprises a third terminal disposed in the terminal base for electrically connecting the diode, and the third terminal has a substantially identical configuration to the first and second terminals.

19. The connecting box according to claim 17, the first terminal comprises a first retaining portion, a first contact portion extending from and bending forwardly with respect to the first retaining portion, and a first releasing portion extending from and bending forwardly with respect to the first contact portion.

20. The connecting box according to claim 19, wherein the first terminal further comprises a reverse bend portion located between the first retaining portion and the first contact portion.

* * * * *